United States Patent
Agarwal et al.

(10) Patent No.: US 12,513,588 B2
(45) Date of Patent: Dec. 30, 2025

(54) METHODS AND SYSTEMS FOR ENSURING CONTINUITY OF SERVICES ON HANDOVER FROM WI-FI TO CELLULAR NETWORKS

(71) Applicant: SAMSUNG ELECTRONICS CO., LTD., Suwon-si (KR)

(72) Inventors: Rishav Agarwal, Bangalore (IN); Shouvik Guha, Bangalore (IN); Sumit Verma, Bangalore (IN); Shanthossh Nagarajan, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 596 days.

(21) Appl. No.: 17/966,481

(22) Filed: Oct. 14, 2022

(65) Prior Publication Data

US 2023/0036966 A1    Feb. 2, 2023

Related U.S. Application Data

(63) Continuation of application No. PCT/KR2021/004922, filed on Apr. 20, 2021.

(30) Foreign Application Priority Data

Apr. 20, 2020  (IN) .............................. 202041016922
Apr. 8, 2021   (IN) .............................. 202041016922

(51) Int. Cl.
*H04W 36/00* (2009.01)
*H04W 36/14* (2009.01)
(Continued)

(52) U.S. Cl.
CPC ..... *H04W 36/26* (2013.01); *H04W 36/00226* (2023.05); *H04W 36/1446* (2023.05); *H04W 36/18* (2013.01)

(58) Field of Classification Search
CPC .......... H04W 36/26; H04W 36/00226; H04W 36/1446; H04W 36/18; H04W 88/06
(Continued)

(56) References Cited

U.S. PATENT DOCUMENTS 9,392,499 B2    7/2016  Sylvain
2014/0286308 A1  9/2014  Lee et al.
(Continued)

FOREIGN PATENT DOCUMENTS

KR    10-2056408    12/2019

OTHER PUBLICATIONS

Ericsson, 'Use of EPS/RAT fallback for VoWiFi session', S2-2000338, 3GPP TSG SA Meeting #136AH, Incheon, Korea, section 4.13.6.3, Jan. 7, 2020, 5 pages.
(Continued)

*Primary Examiner* — Marcos Batista
(74) *Attorney, Agent, or Firm* — NIXON & VANDERHYE P.C.

(57) ABSTRACT

Methods and systems for ensuring continuity of services on handover from Wi-Fi to cellular networks are disclosed. Embodiments of the disclosure allow a UE to seamlessly engage in a call during a handover, which is triggered on detecting that QoS of the call is less than a threshold within a coverage area of the Wi-Fi. The continuity of the call is ensured by triggering a handover from Wi-Fi to LTE and preventing/reducing handover from Wi-Fi to NR. The UE avails calling services using LTE and data services using NR, by enabling NSA mode. The UE is allowed to avail calling services seamlessly by initiating a handover of the calling services from Wi-Fi to LTE and avail data services seamlessly by initiating a handover of the data services from Wi-Fi to NR. The handover from Wi-Fi to LTE/NR is
(Continued)

initiated if QoS of the calling/data services is less than a threshold in Wi-Fi coverage area.

18 Claims, 5 Drawing Sheets

(51) Int. Cl.
  *H04W 36/18* (2009.01)
  *H04W 36/26* (2009.01)
(58) Field of Classification Search
  USPC .......................................... 455/442; 370/338
  See application file for complete search history.

(56) References Cited

U.S. PATENT DOCUMENTS

| | | |
|---|---|---|
| 2016/0014664 A1 | 1/2016 | Singh et al. |
| 2018/0206153 A1 | 7/2018 | Qu et al. |
| 2021/0076441 A1* | 3/2021 | Guha .................... H04W 40/20 |
| 2021/0136645 A1* | 5/2021 | Zhao .................... H04W 36/30 |

OTHER PUBLICATIONS

LG Electronics, 'Support of VoWiFi handover with EPS/RAT fallback (UE based solution)', S2-1909682, 3GPP TSG SA Meeting ∩135, Split, Croatia, section 4.13.6.X, Oct. 14, 2019, 5 pages.
Ericsson et al., 'Use of EPS/RAT fallback for VoWiFi session', S2-2001342, 3GPP TSG SA Meeting #136AH, Incheon, Korea, section 4.13.6.3, Jan. 16, 2020, 5 pages.
Catt et al., 'Corrections on EPS fallback and RAT fallback for IMS voice', S2-2002440, 3GPP TSG SA Meeting #137E, Elbonia, section 4.13.6.2, Feb. 29, 2020, 5 pages.
Indian Office Action for IN202041016922 dated Feb. 9, 2022, 8 pages.
International Search Report for PCT/KR2021/004922 mailed Aug. 11, 2021, 4 pages.
Written Opinion of the ISA for PCT/KR2021/004922 mailed Aug. 11, 2021, 5 pages.
Indian Office Action issued Jul. 25, 2024 in corresponding Indian Patent Application No. 202041016922.

* cited by examiner

METHODS AND SYSTEMS FOR ENSURING CONTINUITY OF SERVICES ON HANDOVER FROM WI-FI TO CELLULAR NETWORKS

CROSS-REFERENCE TO RELATED APPLICATIONS

This application is a continuation of International Application No. PCT/KR2021/004922 designating the United States, filed on Apr. 20, 2021, in the Korean Intellectual Property Receiving Office and claiming priority to Indian Provisional Patent Application No. 202041016922, filed on Apr. 20, 2020, in the Indian Patent Office, and to Indian Complete Patent Application No. 202041016922, filed on Apr. 8, 2021, in the Indian Patent Office, the disclosures of all of which are incorporated by reference herein in their entireties.

BACKGROUND

Field

The disclosure relates to handovers from Wireless-Fidelity (Wi-Fi) networks to cellular networks, and for example, to methods and systems for ensuring service continuity in an event of a handover from a Wi-Fi network to a cellular network.

Description of Related Art

In current Stand-Alone deployments of New Radio (NR), a User Equipment (UE), availing voice and/or data services in a coverage area of Wireless-Fidelity (Wi-Fi), can detect issues such as increase in rate of call-drops, delay in voice packet delivery for substantial time duration, and so on, when the UE starts availing the voice and/or data services from Fifth Generation-Standalone (5G-SA) or NR-SA. The UE avails the voice and/or data services using the 5G-SA when the UE leaves the Wi-Fi coverage area and enters a coverage area of the 5G-SA. The UE leaves the Wi-Fi coverage area when the Quality of Service (QoS) of the voice and/or data services is not met in the Wi-Fi coverage area.

Currently, due to the lack of Voice Over NR (VO-NR) deployments, Evolved Packet System (EPS) fallback is being used; wherein an existing VoWiFi call is first re-directed to a 5G-SA cell through a handover from a Wi-Fi cell to the 5G-SA cell, followed by another handover from the 5G-SA cell to a 4G cell. The UE is, thus, redirected to utilize EPS services for continuing with the VoWiFi call. The redirection from Wi-Fi to 5G-SA and the subsequent redirection from 5G-SA to EPS introduces signalling overhead and increases the latency of the overall handover (from Wi-Fi to EPS) in order of a few seconds, which degrades user experience. The latency of the overall handover increases due to redundant signalling in SA mode, which involves signalling for establishment of Protocol Data Unit (PDU) sessions with Internet Protocol (IP)-Multimedia Core Network Subsystem (IMS) through 5G network, for routing voice traffic. The PDU sessions are rejected due to the non-deployment of VO-NR services.

The increase in latency also contributes to call drops. Consider that a call is in progress on VoWiFi stack of the UE. If the UE is at the edge of the coverage area of a Wi-Fi network, and, consequently, if the Wi-Fi signal becomes weak or if the Wi-Fi signal gets lost, EPS fallback mechanism will be triggered. The EPS fallback mechanism is triggered after the attempts to establish the PDU sessions with the 5G network fail. The latency involved in redirecting the call from Wi-Fi to 5G, and subsequently from 5G to 4G, causes unnecessary delay in overall handover (Wi-Fi to 4G) and can lead to call-drop. For example, a handover procedure from Wi-Fi to 4G can be executed in 200 milliseconds, while the EPS fallback procedure is likely to involve a delay of at least 5.5 seconds, apart from the latency involved in the handover from Wi-Fi to 5G If the UE is in the coverage area of a 4G cell when the VoWiFi call is initiated, the UE may perform B2 measurements as a part in the attempt to connect to the 5G network through inter-Radio Access Technology (RAT) handover. The UE can attempt to connect to the 5G network due to preference of 5G connectivity over 4G connectivity, if the UE comes within the coverage area of the 5G network, or if the priority of 5G is higher than the priority of 4G. Once the UE is connected to the 5G network, the UE is likely to encounter the latency issues involved in the EPS fallback mechanism, which might arise if the Wi-Fi signal is lost or becomes weak, and if the UE moves out the coverage area of the Wi-Fi.

SUMMARY

Embodiments of the disclosure provide methods and systems for enabling a User Equipment (UE) to seamlessly engage in a voice/video call by triggering a handover from Wireless-Fidelity (Wi-Fi) to Long Term Evolution (LTE) and preventing/reducing a potential handover from Wi-Fi to New Radio (NR).

Embodiments of the disclosure trigger the handover from Wi-Fi to LTE, on detecting that Quality of Service (QoS) pertaining to the call is less than a predefined threshold, wherein the potential handover from Wi-Fi to NR is prevented/reduced by at least one of disabling NR capability of the UE, reducing the priority of NR over that of LTE, and preventing/reducing NR cell measurements for connecting with NR.

Embodiments of the disclosure enable the UE to provide at least one of calling services using LTE and data services using NR, by enabling Non-Standalone (NSA) mode in the UE, in an event of handover of at least one of the calling services and the data services from Wi-Fi to LTE and/or NR, wherein the UE enables the NSA mode on detecting that at least one QoS pertaining to at least one of the calling services and the data services is less than a predefined threshold.

Embodiments of the disclosure trigger the handover from Wi-Fi to NR; on detecting that QoS pertaining to the data services is less than a predefined threshold, wherein an inter-Radio Access Technology (RAT) handover from LTE to NR can be triggered to enable the triggering of handover from Wi-Fi to NR, if the UE is in connected to LTE.

Embodiments of the disclosure trigger the handover from Wi-Fi to LTE; on detecting that QoS pertaining to the calling services is less than a predefined threshold, wherein a Traffic Area Update (TAU) to LTE can be triggered to enable the triggering of handover from Wi-Fi to LTE, if the UE is connected to NR.

Accordingly, example embodiments provide methods and systems for managing call continuity in a $5^{th}$ Generation (5G) User Equipment (UE). The embodiments enable a User Equipment (UE), to seamlessly engage in a calling services or data services in an event of a handover. A method according to an example embodiment includes: detecting that the UE is engaged in a call and/or transfer of data using a Wireless Fidelity (Wi-Fi) network; detecting that the UE is connected to a cellular network while engaging in the call and/or the data transfer, wherein the cellular network can be a Long Term Evolution (LTE) network or a New Radio (NR) network; based on the UE detecting that a Quality of Service (QoS) of the call and/or QoS of the data transfer has dropped below respective specified thresholds, initiating a handover procedure from the Wi-Fi network to the cellular network; based on the UE being connected to the LTE network and based on the QoS of the call being detected to be less than the specified threshold in the coverage area of the Wi-Fi network, trigger a handover from the Wi-Fi network to the LTE network. Accordingly, various example embodiments may prevent and/or reduce a handover from the Wi-Fi network to the NR network.

In an example embodiment, a handover procedure, from the Wi-Fi network to the NR network, is triggered for enabling the data services to be delivered by the NR network, if the QoS of the data transfer is less than the predefined threshold. This allows the UE to camp on to a NR cell of the NR network and ensure the continuity of the data transfer. The handover is initiated if the UE is connected to the LTE network and engaged in the call and the data transfer using the Wi-Fi network. In an embodiment, a handover procedure, from the Wi-Fi network to the LTE network, is triggered for enabling the calling services to be delivered by the LTE network, if the QoS of the calling transfer is less than the predefined threshold. This allows the UE to camp on to a LTE cell of the LTE network and ensure the continuity of the data transfer. The handover is initiated if the UE is connected to the NR network and engaged in the call and the data transfer using the Wi-Fi network.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

Various example embodiments of the disclosure can provide methods and systems for enabling a User Equipment (UE) to seamlessly engage in a voice/video call by triggering a handover from Wireless-Fidelity (Wi-Fi) to Long Term Evolution (LTE) and preventing/reducing a potential handover from Wi-Fi to New Radio (NR).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
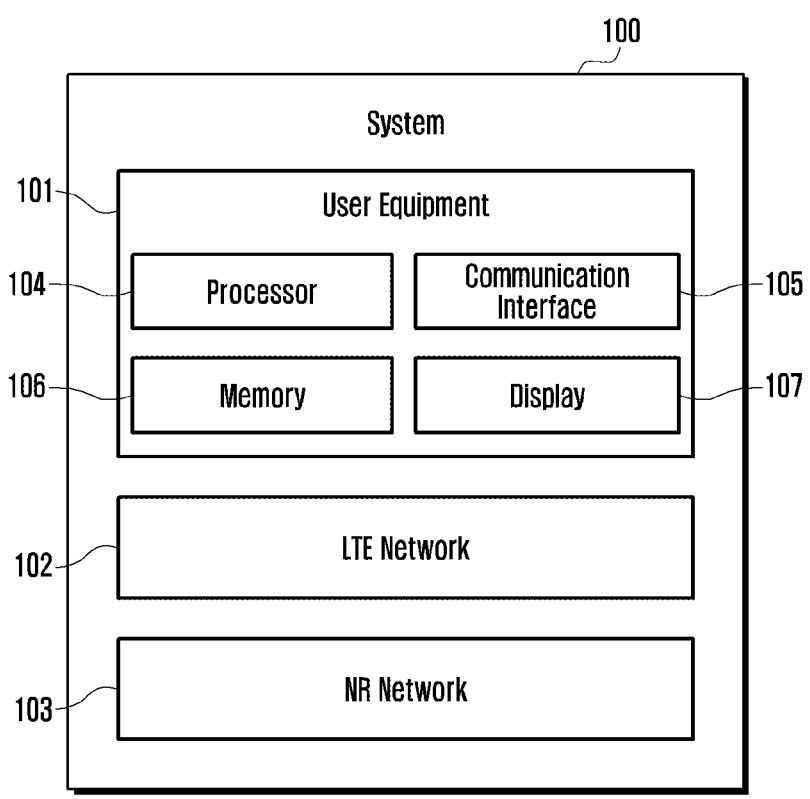
FIG. 1 is a block diagram illustrating an example configuration of a system according to various embodiments.

The various example embodiments herein and the various features and advantageous details thereof are explained more fully with reference to the non-limiting example embodiments illustrated in the accompanying drawings and detailed in the following description. Descriptions of well-known components and processing techniques may be omitted so as to not unnecessarily obscure the description with unnecessary detail. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling a User Equipment (UE) to seamlessly engage in a voice/video call in an event of a handover from Wireless-Fidelity (Wi-Fi) to a cellular network. If the UE is camped to a Long Term Evolution (LTE) cell, the embodiments include preventing/reducing a potential handover from Wi-Fi to New Radio (NR) when the voice/video call is initiated. The embodiments include preventing/reducing the handover from Wi-Fi to NR by disabling the NR capability of the UE, preventing/reducing NR cell measurements and reducing the priority of NR over the priority of LTE. The embodiments include preventing/reducing inter-Radio Access Technology (RAT) handover from LTE to NR during the call, if the UE is camped on the LTE cell. The embodiments include triggering the handover if the UE detects that Quality of Service (QoS) pertaining to the call is less than a predefined (e.g., specified) threshold within a coverage area of the Wi-Fi. The embodiments include triggering a handover from the Wi-Fi to the LTE cell for improving the QoS pertaining to the call. Once the call is completed, the UE can enable 5G cell capability of the UE and the increase the priority of 5G connectivity for enabling the UE to connect to a NR cell.

If the UE enters into the coverage area of a NR cell during the call or if the UE is in the coverage area of the NR cell during the call, the embodiments include performing a Traffic Area Update (TAU) to the LTE cell for enabling an inter-RAT handover from NR to LTE. If the QoS pertaining to the call is detected to be less than the predefined threshold within the coverage area of the Wi-Fi, the embodiments include triggering a handover from the Wi-Fi to the LTE cell for improving the QoS pertaining to the call. Once the call is completed, the UE can initiate 5G cell measurements for connecting to a NR cell.

In an embodiment, the UE can be enabled to take advantage at least one of calling services using LTE and data services, using NR, by enabling Non-Standalone (NSA) mode in the UE, if the QoS pertaining to at least one of the calling services and data services is less than a predefined threshold in the coverage area of the Wi-Fi. The UE can take advantage of at least one of the calling services and the data services in an event of handover of at least one of the calling services and the data services from Wi-Fi to LTE and/or NR.

The embodiments include triggering a handover procedure from Wi-Fi to NR on detecting that QoS pertaining to the data services is less than a predefined threshold. The handover from Wi-Fi to NR can be triggered by initiating an inter-RAT handover from LTE to NR, if the UE is in the coverage area of a LTE cell. The embodiments include triggering a handover procedure from Wi-Fi to LTE on detecting that the QoS pertaining to the calling services is less than the predefined threshold. The handover from Wi-Fi to LTE can be triggered by performing a Traffic Area Update (TAU) to LTE, if the UE is in the coverage area of a NR cell.

Referring now to the drawings, and more particularly to FIGS. 1 through 5, where similar reference characters denote corresponding features consistently throughout the figures, there are shown various example embodiments.

FIG. 1 is a block diagram illustrating an example configuration of a system 100 according to various embodiments. The system may comprise a UE 101, a LTE network 102, and a NR network 103, wherein the UE 101, connected to a Wi-Fi network, is configured to ensure continuity of services in an event of a handover from the Wi-Fi network to a cellular network, according to embodiments as disclosed herein. The cellular network can be the LTE network 102 or the NR network 103. The UE 101 is connected to the Wi-Fi network and is availing at least one of calling (voice/video) services and data services. The UE 101 is simultaneously connected to one of the cellular networks, e.g., the LTE network 102 or the NR network 103. The UE 101 is capable of operating in Non-Standalone (NSA) mode.

As illustrated in FIG. 1, the UE 101 comprises a processor (e.g., including processing circuitry) 104, a communication interface (e.g., including communication circuitry) 105, a memory 106, and a display 107. The UE 101 can be connected to the LTE network 102 through a 4G cell or connected to the NR network 103 through a 5G cell. In an embodiment, the LTE network 102 can include an evolved Node B (eNB) (in the 4G cell) and an Evolved Packet Core (EPC). Similarly, the NR network 103 can include a Next Generation Node B (gNB) (in the 5G cell) and a Next Generation Core (NGC).

Consider that the UE 101 is the coverage area of a Wi-Fi network (not shown) and a user of the UE 101 is engaged in a call. The user is availing the calling services using Voice over Wi-Fi (VoWiFi). If the UE 101 is connected to the LTE network 102, and if the processor 104 detects that a VoWiFi call has been initiated by the user, the processor 104 can prevent/reduce an occurrence of a handover from the Wi-Fi network to the NR network 103. The processor 104 needs to prevent/reduce the occurrence of the handover from the Wi-Fi network to the NR network 103 since the user can prioritize Fifth Generation (5G) connectivity over Fourth Generation (4G) connectivity. In an embodiment, the processor 104 can prevent/reduce the handover from the Wi-Fi network to the NR network 103 by disabling the NR capability of the UE 101, refraining from performing NR cell measurements, reducing the priority of the NR network 103 to that of LTE network 102, and so on. The processor 104 can prevent/reduce the occurrence of an inter-RAT handover from the LTE network 102 to the NR network 103 during the VoWiFi call, to prevent/reduce the UE 101 from connecting to the NR network 103.

If the processor 104 detects that QoS of the VoWiFi call has dropped below a predefined threshold in the coverage area of the Wi-Fi network, the processor 104 can trigger a handover from the Wi-Fi network to the LTE network 102. In an embodiment, the predefined threshold can be set by at least one of the UE 101, the LTE network 102, and the NR network 103. In an example, consider that one of the QoS parameters is the received Wi-Fi signal strength. The predefined threshold is configured as −100 dBm. If the strength of the received Wi-Fi signal is greater than −100 dBm, the processor 104 considers that the QoS requirements are being met. The processor 104 is configured to measure the Wi-Fi signal strength periodically. If the strength of the received Wi-Fi signal is detected to be less than −100 dBm, the processor 104 can interpret that the QoS of the VoWiFi call has dropped below the predefined threshold.

After the handover, the VoWiFi call is converted to a Voice over LTE (VoLTE) call. The processor 104 triggers the handover from the Wi-Fi network to the LTE network 102 for ensuring the continuity of the call and ensuring that there is minimum latency involved in the handover. When the processor 104 detects that the VoLTE call has been completed, the processor 104 can enable the NR capability of the UE 101, increase the priority of 5G connectivity over 4G connectivity, and allow inter-RAT handover from network to the NR network 103, for enabling the UE 101 to connect to a NR cell.

Consider that the UE 101 is the coverage area of the Wi-Fi network and a user of the UE 101 is engaged in a VoWiFi call, wherein the UE 101 is connected to the NR network 103. The UE 101 can be in the coverage area of the NR network 103 if the UE 101 had entered into the coverage area of a NR cell during the VoWiFi call or if the UE 101 was originally in the coverage area of the NR cell prior to the initiation of the VoWiFi call. If the processor 104 detects that a voice/video call has been initiated by the user, the processor 104 prevents/reduces the occurrence of a handover from the Wi-Fi network to the NR network 103. The processor 104 is configured to prevent/reduce the occurrence of the handover from the Wi-Fi network to the NR network 103, since Evolved Packet System (EPS) fallback mechanism will be triggered as a result of the handover. This is because Voice over NR (VoNR) has not been enabled in the NR network 103 and the EPS fallback mechanism will increase the latency of the handover and degrade user experience.

In an embodiment, the processor 104 can prevent/reduce the handover from the Wi-Fi network to the NR network 103 by sending a TAU to the LTE network 102. This enables the triggering of an inter-RAT handover from the NR network 103 to the LTE network 102. When the inter-RAT handover is completed, the UE 101 is connected to the LTE network 102. Thereafter, if the QoS pertaining to the VoWiFi call is detected to be less than the predefined threshold within the coverage area of the Wi-Fi network, the processor 104 triggers a handover from the Wi-Fi network to the LTE network 102. The handover converts the VoWiFi call into a VoLTE call and ensures that there is minimum latency involved in the handover. When the processor 104 detects that the VoLTE call has been completed, the processor 104 can initiate NR cell measurements for connecting to a NR cell of the NR network 103.

Consider that the UE 101 is the coverage area of a Wi-Fi network and a user of the UE 101 is engaged in a VoWiFi call and/or data transfer in the coverage area of the Wi-Fi network. The UE 101 can avail at least one of calling services using the LTE network 102 and data services using the NR network 103, by enabling Non-Standalone (NSA) mode in the UE 101.

In an embodiment, the processor 104 detects that the user is engaged in a VoWiFi call and data transfer, and the UE 101 is connected to the LTE network 102. If the processor 104 detects that QoS of the VoWiFi call and the data transfer have dropped below the respective predefined thresholds pertaining to the VoWiFi call and the data transfer within the coverage area of the Wi-Fi network, the processor 104 can simultaneously trigger a handover from the Wi-Fi network to the LTE network 102 and connect with the NR network 103 to trigger another handover from the Wi-Fi network to the NR network 103. The handover from the Wi-Fi network to the LTE network 102 converts the VoWiFi call to a VoLTE call and ensures continuity of the call. The handover from the Wi-Fi network to the NR network 103 allows resumption of data services using NR and ensures continuity of the data transfer.

In an embodiment, the processor 104 detects that the user is engaged in a voice/video call and data transfer, and the UE 101 is connected to the NR network 103. If the processor 104 detects that QoS of the VoWiFi call and the data transfer have dropped below the respective predefined thresholds pertaining to the VoWiFi call and the data transfer within the coverage area of the Wi-Fi network, the processor 104 can simultaneously trigger a handover from the Wi-Fi network to the NR network 103 and connect with the LTE network 102 to trigger another handover from the Wi-Fi network to the LTE network 102. The handover from the Wi-Fi network to the LTE network 102 converts the VoWiFi call to a VoLTE call and ensures continuity of the call. The handover from the Wi-Fi network to the NR network 103 allows resumption of data services using NR and ensures continuity of the data transfer.

Consider that the UE 101 is the coverage area of a Wi-Fi network and a user of the UE 101 is availing data services. If the UE 101 is connected to the LTE network 102, and if the processor 104 detects that data transfer has been initiated by the user, the processor 104 can connect to the NR network 103 in the NSA mode. If the processor 104 detects that QoS pertaining to the data services has dropped below a predefined threshold in the coverage area of the Wi-Fi network, the processor 104 can trigger a handover from the Wi-Fi network to the NR network 103. The processor 104 can trigger the handover from the Wi-Fi network to the NR network 103 for ensuring that there is minimum latency involved in the handover and continuation of the data transfer.

Similarly, if the UE 101 is connected to the NR network 103 and the UE is availing data services using the Wi-Fi network, then the processor 104 can trigger a handover from the Wi-Fi network to the NR network 103, if the processor 104 detects that QoS pertaining to the data services has dropped below the predefined threshold in the coverage area of the Wi-Fi network. The handover from the Wi-Fi network to the NR network 103 ensures that there is minimum latency involved in the handover and the continuation of the data transfer.

FIG. 1 illustrates various example components of the system 100, but it is to be understood that other embodiments are not limited thereon. In various embodiments, the system 100 may include less or more number of units. Further, the labels or names of the units of the system 100 are used only for illustrative purpose and does not limit the scope of the disclosure. One or more units can be combined together to perform same or substantially similar function in the system 100.

Figure 2:
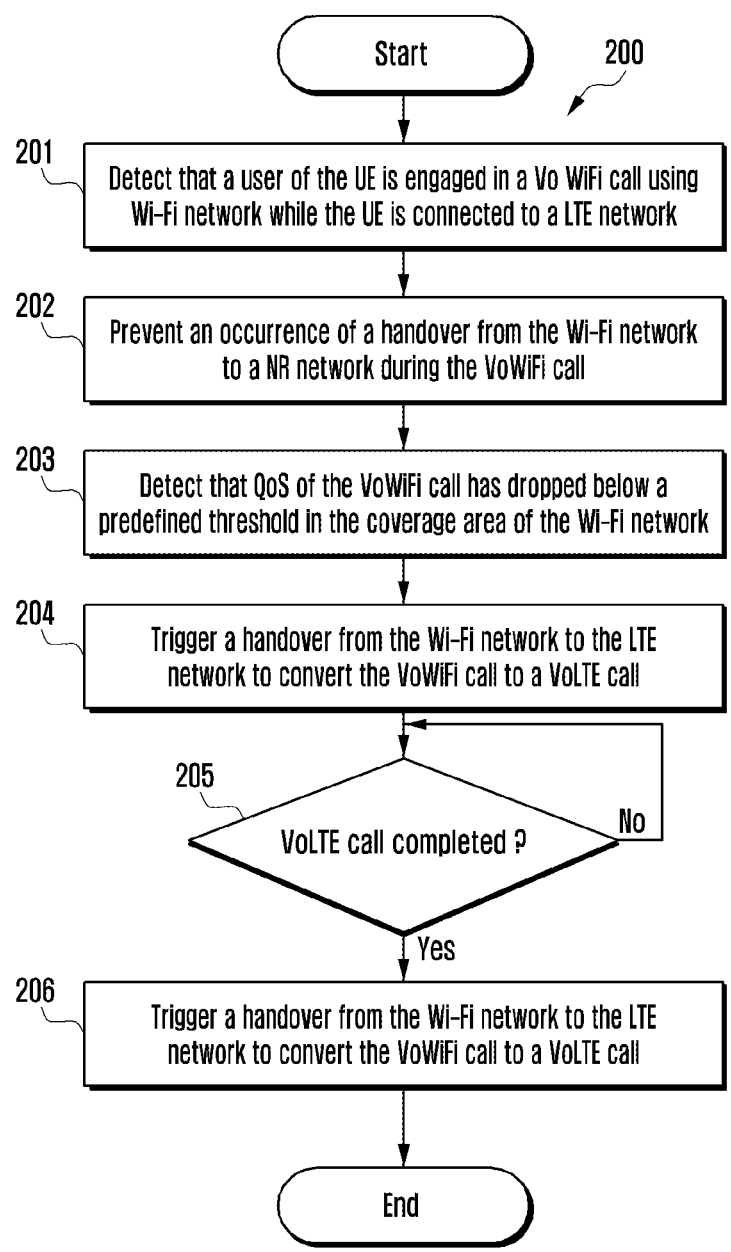
FIG. 2 is a flowchart illustrating an example method for ensuring continuity of calling services in the UE, in an event of a handover from the Wi-Fi network to the LTE network, according to various embodiments.

FIG. 2 is a flowchart 200 illustrating an example method for ensuring continuity of calling services in the UE 101 in an event of a handover from the Wi-Fi network to the LTE network 102, according to various embodiments. At 201, the method includes detecting that a user of the UE 101 is engaged in a VoWiFi call using the Wi-Fi network, while the UE 101 is connected to the LTE network 102. The embodiments include detecting that the UE 101 is the coverage area of the Wi-Fi network and is engaged in the VoWiFi call. At 202, the method includes preventing/reducing an occurrence of a handover from the Wi-Fi network to the NR network 103 during the VoWiFi call. The embodiments include preventing/reducing the occurrence of the handover from the Wi-Fi network to the NR network 103 on detecting that the VoWiFi call has been initiated by the user.

In an embodiment, the occurrence of the handover from the Wi-Fi network to the NR network 103 is prevented/reduced by at least one of disabling the NR capability of the UE 101, refraining from performing NR cell measurements and reducing the priority of the NR network 103 to that of LTE network 102. In an embodiment, the occurrence of an inter-RAT handover from the LTE network 102 to the NR network 103 is prevented/reduced during the VoWiFi call, to prevent/reduce the UE 101 from connecting to the NR network 103 during the VoWiFi call.

At 203, the method includes detecting that QoS of the VoWiFi call has dropped below a predefined threshold in the coverage area of the Wi-Fi network. At 204, the method includes triggering a handover from the Wi-Fi network to the LTE network 102, on detecting that the QoS of the VoWiFi call has dropped below the predefined threshold. The handover converts the VoWiFi call into a VoLTE call. At 205, the method includes determining whether the VoLTE call is completed. If it is determined that the VoLTE call has been completed, then the method includes at 206, enabling the triggering of handover from the LTE network 102 to the NR network 103. On the other hand, if it is determined that the VoLTE call has not been completed, the embodiments include monitoring whether the VoLTE call has been completed. When the VoLTE call is completed the embodiments include enabling the NR capability of the UE 101, increasing the priority of 5G connectivity over 4G connectivity, and allowing inter-RAT handover from the LTE network 102 to the NR network 103, for enabling the UE 101 to connect to a NR cell.

The various actions in the flowchart 200 may be performed in the order presented, in a different order, or simultaneously. Further, in various embodiments, some actions listed in FIG. 2 may be omitted.

Figure 3:
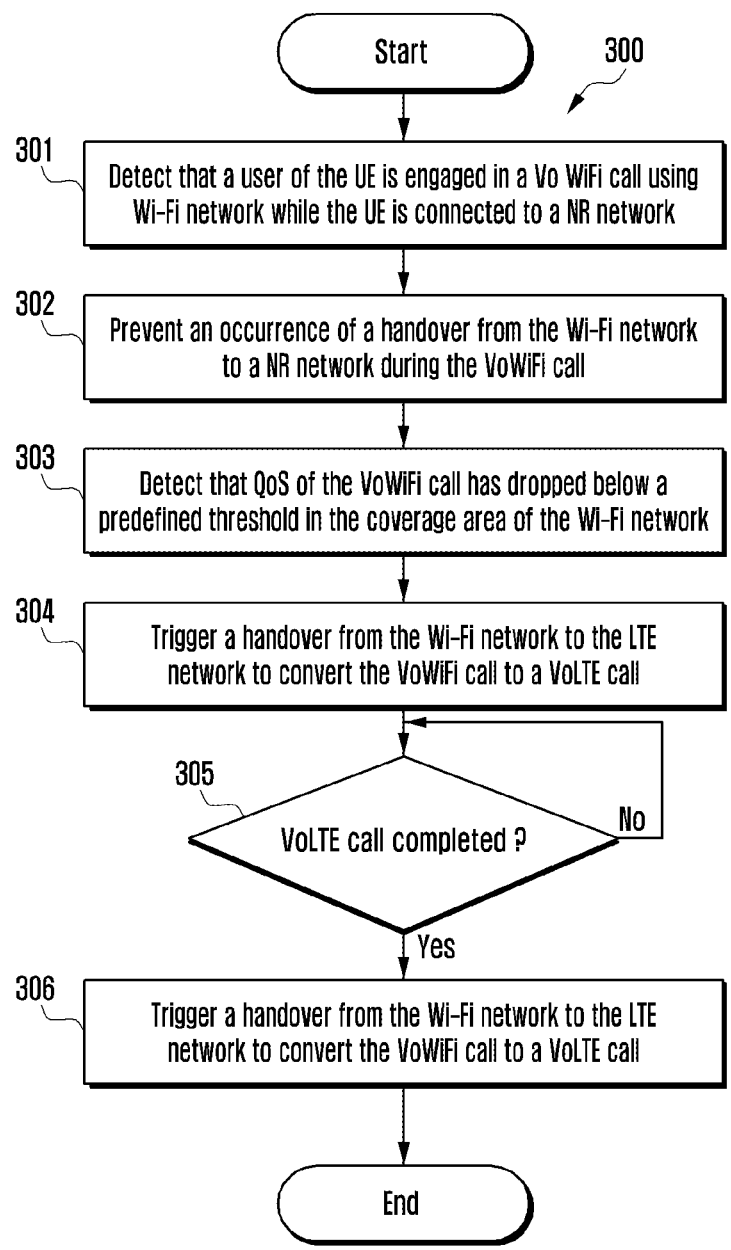
FIG. 3 is a flowchart illustrating an example method for ensuring continuity of calling services in the UE, in an event of a handover from the Wi-Fi network to the LTE network, according to various embodiments.

FIG. 3 is a flowchart 300 illustrating an example method for ensuring continuity of calling services in the UE 101 in an event of a handover from the Wi-Fi network to the LTE network 102, according to various embodiments. At 301, the method includes detecting that a user of the UE 101 is engaged in a VoWiFi call using the Wi-Fi network, while the UE 101 is connected to the NR network 103. The embodiments include detecting that the UE 101 is the coverage area of the Wi-Fi network and is engaged in the VoWiFi call. The UE 101 is in the coverage area of the NR network 103.

At 302, the method includes preventing/reducing an occurrence of a handover from the Wi-Fi network to the NR network 103 during the VoWiFi call. The embodiments include preventing/reducing the occurrence of the handover from the Wi-Fi network to the NR network 103 in order to prevent/reduce the triggering of the EPS fallback mechanism. The EPS fallback mechanism is triggered when the Protocol Data Unit (PDU) session Establishment requests with the NR network 103 fail after the handover from the Wi-Fi network to the NR network 103. The EPS fallback mechanism will increase the latency of the handover of the VoWiFi call and degrade user experience.

In an embodiment, the occurrence of the handover from the Wi-Fi network to the NR network 103 is prevented/ reduced by connecting to the LTE network 102. The UE 101 can send a TAU to the LTE network 102 for connecting to the LTE network 102. The embodiments include enabling the triggering of inter-RAT handover from the NR network 103 to the LTE network 102. Once the UE 101 is connected to the LTE network 102, the embodiments include preventing/reducing the UE 101 from reconnecting to the NR network 103 until the VoWiFi call is completed.

At 303, the method includes detecting that the QoS pertaining to the VoWiFi call has dropped below a predefined threshold in the coverage area of the Wi-Fi network. At 304, the method includes triggering a handover from the Wi-Fi network to the LTE network 102, on detecting that the QoS of the VoWiFi call has dropped below the predefined threshold. The handover converts the VoWiFi call into a VoLTE call. At 305, the method includes determining whether the VoLTE call is completed. If it is determined that the VoLTE call has been completed, then the method includes at 306, enabling the triggering of handover from the LTE network 102 to the NR network 103. On the other hand, if it is determined that the VoLTE call has not been completed, the embodiments include monitoring whether the VoLTE call has been completed. Once the VoLTE call is completed the embodiments include allowing inter-RAT handover from the LTE network 102 to the NR network 103, for enabling the UE 101 to connect to a NR cell, by initiate NR cell measurements.

The various actions in the flowchart 300 may be performed in the order presented, in a different order, or simultaneously. Further, in various embodiments, some actions listed in FIG. 3 may be omitted.

Figure 4:
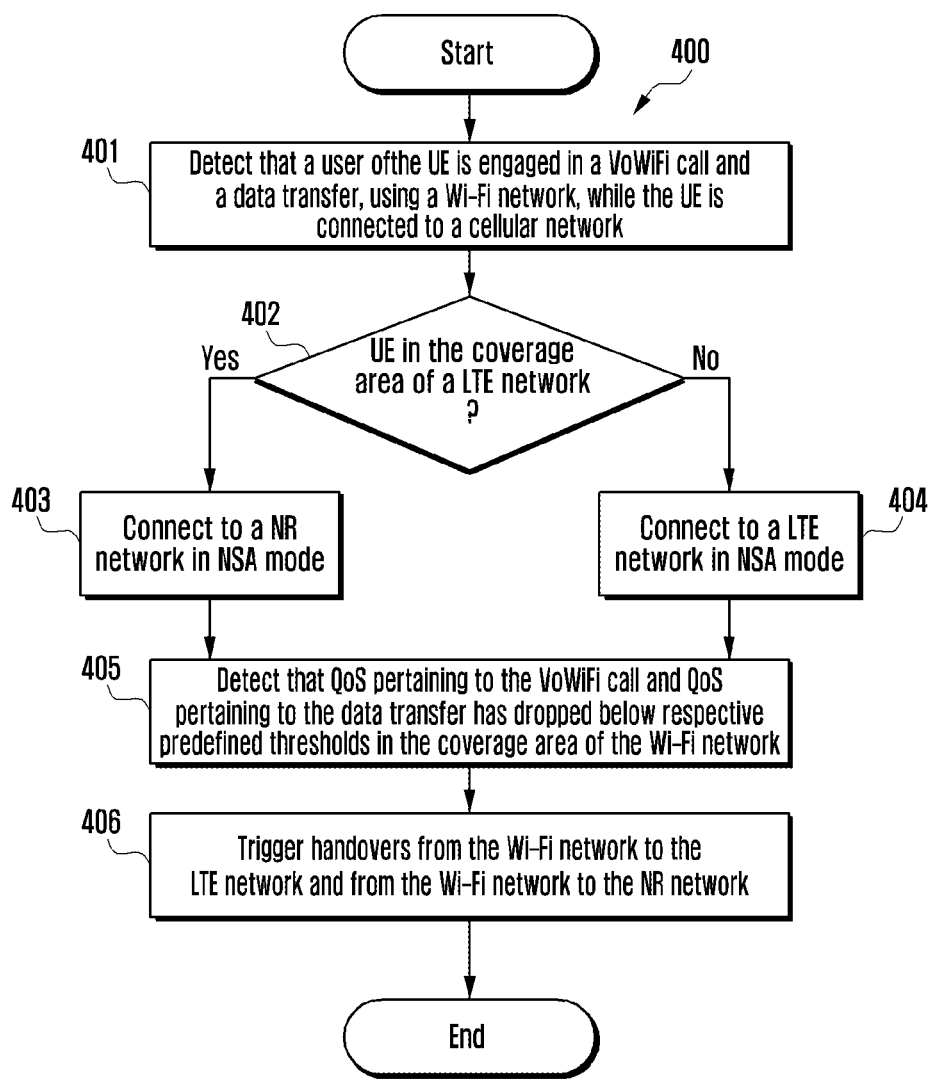
FIG. 4 is a flowchart illustrating an example method for ensuring continuity of calling services and data services in the UE in an event of handovers from the Wi-Fi network to the LTE network and the NR network respectively, according to various embodiments.

FIG. 4 is a flowchart 400 illustrating an example method for ensuring continuity of calling services and data services in the UE 101 in an event of handovers from the Wi-Fi network to the LTE network 102 and the NR network 103 respectively, according to various embodiments. At 401, the method includes detecting that a user of the UE 101 is engaged in a VoWiFi call and a data transfer, using the Wi-Fi network, while the UE 101 is connected to a cellular network. The cellular network can be the LTE network 102 or the NR network 103. The embodiments include detecting that the UE 101 is the coverage area of the Wi-Fi network and is engaged in the VoWiFi call and the data transfer.

At 402, the method includes detecting whether the UE 101 is in the coverage area of the LTE network 102. If it is determined that the UE 101 is in the coverage area of the LTE network 102, the method includes, at 403, connecting to the NR network 103 in the NSA mode. On the other hand, if it is determined that the UE 101 is in not the coverage area of the LTE network 102, it is implied that the UE 101 is connected to the NR network 103. The method includes, at 404, connecting to the LTE network 102 in the NSA mode. The UE 101 is connected to the LTE network 102 and the NR network 103 simultaneously.

At 405, the method includes detecting that the QoS pertaining to the VoWiFi call and the QoS pertaining to the data transfer has dropped below respective predefined thresholds within the coverage area of the Wi-Fi network. At 406, the method includes triggering handovers from the Wi-Fi network to the LTE network 102 and from the Wi-Fi network to the NR network 103. The handovers are triggered on detecting that the QoS of the VoWiFi call has dropped below the predefined threshold and the QoS of the data services has dropped below the predefined threshold. Once the handovers are triggered, the VoWiFi call is converted into a VoLTE call and the data transfer is initiated through the NR network 103. The handover from the Wi-Fi network to the LTE network 102 ensures the continuity of the (VoWiFi) call, and the handover from the Wi-Fi network to the NR network 103 allows resumption of data services using NR and ensures continuity of the data transfer.

The various actions in the flowchart 400 may be performed in the order presented, in a different order, or simultaneously. Further, in various embodiments, some actions listed in FIG. 4 may be omitted.

Figure 5:
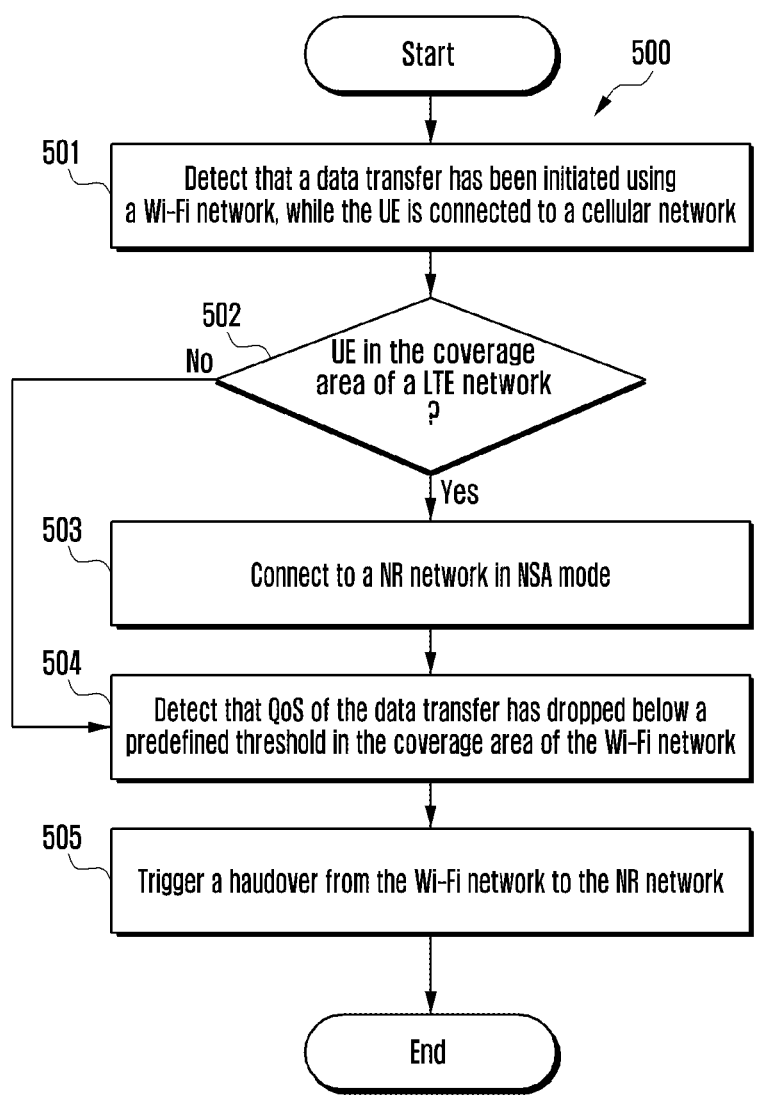
FIG. 5 is a flowchart illustrating an example method for ensuring continuity of data services in the UE in an event of a handover from the Wi-Fi network to the LTE network or the NR network, according to various embodiments.

FIG. 5 is a flowchart 500 illustrating an example method for ensuring continuity of data services in the UE 101 in an event of a handover from the Wi-Fi network to the LTE network 102 or the NR network 103, according to various embodiments. At 501, the method includes detecting that a data transfer has been initiated by a user of the UE 101 using the Wi-Fi network, while the UE 101 is connected to a cellular network. The cellular network can be the LTE network 102 or the NR network 103. The embodiments include detecting that the UE 101 is the coverage area of the Wi-Fi network and is engaged in the data transfer using the Wi-Fi network.

At 502, the method includes detecting whether the UE 101 is in the coverage area of the LTE network 102. If it is determined that the UE 101 is in the coverage area of the LTE network 102, the method includes, at 503, connecting to the NR network 103 in the NSA mode. The UE 101 is connected to the LTE network 102 and the NR network 103 simultaneously. On the other hand, if it is determined that the UE 101 is in not the coverage area of the LTE network 102, it is implied that the UE 101 is connected to the NR network 103 and remains connected to the NR network 103.

At 504, the method includes detecting that the QoS pertaining to the data transfer has dropped below a predefined threshold within the coverage area of the Wi-Fi network. At 505, the method includes triggering a handover from the Wi-Fi network to the NR network 103. The handover from the Wi-Fi network to the NR network 103 is triggered on detecting that the QoS of the data services has dropped below the predefined threshold. Once the handovers are triggered, the data transfer is initiated through the NR network 103. The handover from the Wi-Fi network to the NR network 103 allows resumption of data services using NR and ensures continuity of the data transfer.

The various actions in the flowchart 500 may be performed in the order presented, in a different order, or simultaneously. Further, in various embodiments, some actions listed in FIG. 5 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for enabling a UE 501, connected to a Wi-Fi network, to seamlessly receive services from at least one cellular network in an event of a handover from the Wi-Fi network to the at least one cellular network. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in an embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. The various example embodiments may be implemented on different hardware devices, e.g. using a plurality of Central Processing Units (CPUs).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing service continuity in a User Equipment (UE), the method comprising:
    detecting, by the UE, an engagement in at least one of a Voice/Video over Wireless Fidelity (VoWiFi) call and data transfer, in a Wi-Fi coverage area, wherein the UE is camped on one of a 4th Generation (4G) and a 5G cell; and
    performing, by the UE, at least one action to enable the UE to camp in at least one of the 4G cell and the 5G cell to continue the VoWiFi call and the data transfer, based on a Quality of Service (QOS) of at least one of the VoWiFi call and the data transfer in the Wi-Fi coverage area dropping below a specified threshold;
    wherein the at least one action includes distinguishing the VoWiFi call from the data transfer and performing a handover of the VoWiFi call to the 4G cell while performing a handover of the data transfer to the 5G cell.

2. The method, as claimed in claim 1, wherein performing the at least one action includes: operating, by the UE, in a Non-Standalone (NSA) mode, based on the UE being engaged in the VoWiFi call and the data transfer and the UE being detected to be camped on the 4G cell, wherein the 4G cell acts as a primary cell in the NSA mode, wherein the UE adds the 5G cell as a secondary cell in the NSA mode.

3. The method, as claimed in claim 1, wherein performing the at least one action includes: operating, by the UE, in the NSA mode, based on the UE being engaged in the VoWiFi call and the data transfer and the UE being detected to be camped on the 5G cell, wherein the UE adds the 4G cell acts as the primary cell in the NSA mode, wherein the 5G cell acts as the secondary cell in the NSA mode.

4. The method, as claimed in claim 1, wherein performing the at least one action includes: camping, by the UE, in the 4G cell, based on the UE being engaged in the VoWiFi call, wherein the UE is detected to be camped on the 5G cell.

5. The method, as claimed in claim 1, wherein performing the at least one action includes: deprioritizing, by the UE, the 5G cell for reselection, for remaining camped in the 4G cell, based on the UE being engaged in the VoWiFi call, wherein the UE is detected to be camped on the 4G cell.

6. The method, as claimed in claim 1, wherein the at least one action includes: disabling 5G capability of the UE; reducing priority of 5G connectivity; blocking inter-Radio Access Technology (RAT) measurements; performing a Tracking Area Update (TAU) to the 4G cell through a Registered Public Land Mobile Network (RPLMN); triggering an inter-RAT handover from 4G to 5G, and enabling the NSA mode.

7. The method, as claimed in claim 1, wherein the method further comprises: undoing the at least one action on detecting at least one of: termination of the VoWiFi call, and the QoS of at least one of the VoWiFi call and the data transfer in the Wi-Fi coverage area is above the specified threshold.

8. A User Equipment (UE) comprising:
    a communication interface comprising communication circuitry; and
    at least one processor comprising processing circuitry; and
    a memory storing instructions which, when executed individually and/or collectively by the at least one processor, controls the UE to:
    detect an engagement in at least one of a Voice/Video over Wireless Fidelity (VoWiFi) call and data transfer via the communication interface, in a Wi-Fi coverage area, wherein the UE is camped on one of a 4th Generation (4G) and a 5th Generation (5G) cell; and
    perform at least one action to enable camping in at least one of the 4G cell and the 5G cell to continue the VoWiFi call and the data transfer, based on a Quality of Service (QOS) of at least one of the VoWiFi call and the data transfer in the Wi-Fi coverage area dropping below a specified threshold;
    wherein the at least one action includes distinguishing the VoWiFi call from the data transfer and performing a handover of the VoWiFi call to the 4G cell while performing a handover of the data transfer to the 5G cell.

9. The UE, as claimed in claim 8, wherein performing the at least one action includes: operating, by the UE, in a Non-Standalone (NSA) mode, based on the UE being engaged in the VoWiFi call and the data transfer and the UE being detected to be camped on the 4G cell, wherein the 4G cell is configured to act as a primary cell in the NSA mode, wherein the UE is configured to add the 5G cell as a secondary cell in the NSA mode.

10. The UE, as claimed in claim 8, wherein performing the at least one action includes: operating, by the UE, in the NSA mode, based on the UE being engaged in the VoWiFi call and the data transfer and the UE being detected to be camped on the 5G cell, wherein the UE is configured to add the 4G cell configured to act as the primary cell in the NSA mode, wherein the 5G cell is configured to act as the secondary cell in the NSA mode.

11. The UE, as claimed in claim 8, wherein performing the at least one action includes: camping, by the UE, in the 4G cell, based on the UE being engaged in the VoWiFi call, wherein the UE is detected to be camped on the 5G cell.

12. The UE, as claimed in claim 8, wherein performing the at least one action includes: deprioritizing, by the UE, the 5G cell for reselection, for remaining camped in the 4G cell, based on the UE being engaged in the VoWiFi call, wherein the UE is detected to be camped on the 4G cell.

13. The UE, as claimed in claim 8, wherein the at least one action includes: disabling 5G capability of the UE; reducing priority of 5G connectivity; blocking inter-Radio Access Technology (RAT) measurements; performing a Tracking Area Update (TAU) to the 4G cell through a Registered Public Land Mobile Network (RPLMN); triggering an inter-RAT handover from 4G to 5G, and enabling the NSA mode.

14. The UE, as claimed in claim 8, wherein the memory stores instructions which, when executed individually and/or collectively by the at least one processor, controls the UE to: undo the at least one action on detecting at least one of: termination of the VoWiFi call, and the QoS of at least one of the VoWiFi call and the data transfer in the Wi-Fi coverage area is above the predefined threshold.

15. A method for managing service continuity in a User Equipment (UE), the method comprising:
   initiating, by the UE, a Voice/Video over Wireless Fidelity (VoWiFi) call and a data transfer while the UE is connected to at least one of a 4th Generation (4G) cell and a 5G cell;
   detecting, by the UE, that strength of at least one Wi-Fi signal relevant to the VoWiFi call and the data transfer is below a specified threshold; and
   performing an action to continue the VoWiFi call and the data transfer, wherein the action includes distinguishing the VoWiFi call from the data transfer, performing a handover of the VoWiFi call to the 4G cell, and performing a handover of the data transfer to the 5G cell.

16. The method, as claimed in claim 15, wherein the method further comprises sending a request to connect to the 5G cell when the VoWiFi call is completed, wherein a check is performed periodically to determine whether the call is completed.

17. The method as claimed in claim 16, wherein sending the request to connect to the 5G cell when the call is completed includes increasing the priority of the 5G cell.

18. The method as claimed in claim 15, wherein
   the 4G cell is a Master Cell Group (MCG) and the 5G cell is a Secondary Cell Group (SCG); or
   the 5G cell is the MCG and the 4G cell is the SCG.

* * * * *